United States Patent
Subhanjan

(10) Patent No.: US 9,582,803 B2
(45) Date of Patent: Feb. 28, 2017

(54) PRODUCT SPECIFIC LEARNING INTERFACE PRESENTING INTEGRATED MULTIMEDIA CONTENT ON PRODUCT USAGE AND SERVICE

(76) Inventor: Sarkar Subhanjan, Bangalore (IN)

(*) Notice: Subject to any disclaimer, the term of this patent is extended or adjusted under 35 U.S.C. 154(b) by 493 days.

(21) Appl. No.: 13/520,884

(22) PCT Filed: Jan. 7, 2011

(86) PCT No.: PCT/IN2011/000014
§ 371 (c)(1),
(2), (4) Date: Jul. 6, 2012

(87) PCT Pub. No.: WO2011/083498
PCT Pub. Date: Jul. 14, 2011

(65) Prior Publication Data
US 2012/0322042 A1 Dec. 20, 2012

(30) Foreign Application Priority Data
Jan. 7, 2010 (IN) .............................. 43/CHE/2010

(51) Int. Cl.
G06Q 30/00 (2012.01)
G06Q 30/02 (2012.01)
G09B 5/00 (2006.01)

(52) U.S. Cl.
CPC ........... *G06Q 30/016* (2013.01); *G06Q 30/02* (2013.01); *G09B 5/00* (2013.01)

(58) Field of Classification Search
CPC .................................................. G06Q 30/016
USPC ........................................................ 434/308
See application file for complete search history.

(56) References Cited

U.S. PATENT DOCUMENTS

| | | | |
|---|---|---|---|
| 6,823,492 B1* | 11/2004 | Ambroziak | 715/234 |
| 6,961,954 B1* | 11/2005 | Maybury et al. | 725/53 |
| 8,151,194 B1* | 4/2012 | Chan et al. | 715/716 |
| 2003/0028448 A1* | 2/2003 | Joseph et al. | 705/27 |
| 2007/0027844 A1* | 2/2007 | Toub et al. | 707/3 |
| 2008/0319831 A1* | 12/2008 | Chi et al. | 705/10 |
| 2009/0178010 A1* | 7/2009 | Chaudhri | 715/863 |
| 2010/0131384 A1* | 5/2010 | Chen et al. | 705/26 |
| 2011/0022500 A1* | 1/2011 | Scheinfeld et al. | 705/27.2 |

* cited by examiner

*Primary Examiner* — Robert J Utama
*Assistant Examiner* — Thomas Hong
(74) *Attorney, Agent, or Firm* — The Law Office of Austin Bonderer, PC; Austin Bonderer

(57) ABSTRACT

A computer implemented method that includes providing a product specific learning interface comprising integrated multimedia content on product usage and service to a user. The multimedia content demonstrates a feature of a product stored in a database (112) associated with an application server (104). The method includes processing a first input that includes a selection of the product from a plurality of products, displaying a product specific learning interface including multimedia content specific to the product selected by the input, processing a second input that includes a keyword corresponding to a feature of the product, displaying a sub set of the multimedia content corresponding the keyword and the product, processing a selection of at least one multimedia file from the sub set of the multimedia content, and playing the multimedia file. The keyword is filtered only from a set of multimedia content corresponding to selected product.

20 Claims, 13 Drawing Sheets

| PRODUCT 702 | FEATURE 704 | TRANSCRIPT 706 | VIDEO LINK 708 | AUDIO LINK 710 | TIMESTAMP 712 |
|---|---|---|---|---|---|
| PRODUCT 1 | FEATURE 1A | TRANSCRIPT 1 | VIDEO 1 | AUDIO 1 | 170 SEC |
| PRODUCT 1 | FEATURE 1B | TRANSCRIPT 2 | VIDEO 2 | AUDIO 2 | 245 SEC |
| PRODUCT 1 | FEATURE 1C | TRANSCRIPT 3 | VIDEO 3 | AUDIO 3 | 300 SEC |
| PRODUCT 2 | FEATURE 2A | TRANSCRIPT 4 | VIDEO 4 | AUDIO 4 | 125 SEC |
| PRODUCT 2 | FEATURE 2B | TRANSCRIPT 5 | VIDEO 5 | AUDIO 5 | 200 SEC |

| PRODUCT 802 | USER SEARCH 804 | FEATURE 806 | NUMBER OF HITS 808 |
|---|---|---|---|
| PRODUCT 1 | QUERY 1 | FEATURE 1A | 5 HITS |
| PRODUCT 2 | QUERY 2 | FEATURE 1B | 8 HITS |
| PRODUCT 1 | QUERY 3 | FEATURE 1C | 6 HITS |
| PRODUCT 2 | QUERY 4 | FEATURE 1D | 8 HITS |

PRODUCT SPECIFIC LEARNING INTERFACE PRESENTING INTEGRATED MULTIMEDIA CONTENT ON PRODUCT USAGE AND SERVICE

BACKGROUND

Technical Field

The embodiments herein generally relate to facilitating learning interface using multimedia content, and, more particularly to product specific learning interface using multimedia content on product usage and service.

Description of the Related Art

Traditionally, for various products (e.g., electronic or otherwise) for consumers, product information has been distributed in paper by way of brochures, manuals, instruction booklets, etc. Typically, an instruction manual or a handbook comes with purchase of any product. The manual may come in one or more popular languages. However, when a user has a query related to any use or feature of a product, it may not be easy for the user to quickly find the answer or information that he or she is looking for. Products have become more technologically complex, however manuals continue to remain the same.

Even if the user locates the manual and then the relevant section in the user manual, he may not be able to easily comprehend and apply the complex instructions. Research suggests that people learn most easily not just by reading but by being shown visually along with audio, preferably in the language that they are most conversant with. There is currently no facility for users to experience audio and video and simultaneously to get the relevant information sought through these multi-sensory channels. Further, the user may not have the option of reading the information in his native language, since manuals are typically distributed only in pre-defined languages for any given country.

Such product usage information is nowadays also available on various websites on the internet, such as the company website, review websites and forums. There are search engines for a user to enter keywords relating the feature or specific aspect the user is interested in, and the search engine returns links to hundreds or thousands of websites and web pages. However, most of these results obtained out of each search are not product centric and are out of context. One might expect that with powerful global search tools search results can provide answers to even specific queries. However, in reality for the user to put these increasing numbers of results in perspective and find the correct and contextually relevant answer has become increasingly difficult. Further, the results generated and displayed on the web page can be irrelevant to the search topic and take the user to web pages of entirely different products at times.

SUMMARY

In view of the foregoing, an embodiment herein provides a computer implement method that includes providing a product specific learning interface including integrated multimedia content on product usage and service to a user. The multimedia content demonstrates a feature of a product stored in a database associated with an application server. The method includes processing a first input that includes a selection of the product from a plurality of products, displaying a product specific learning interface including multimedia content specific to the product selected by the input, processing a second input that includes a keyword corresponding to a feature of the product, displaying a sub set of the multimedia content corresponding the keyword and the product, processing a selection of at least one multimedia file from the sub set of the multimedia content, and playing the multimedia file. The keyword is filtered only from a set of multimedia content corresponding to selected product. The multimedia file includes a demonstration of the feature of the selected product. An audio content associated with the video is simultaneously streamed to the video based on a user language preference. A transcript associated with the video and audio content is simultaneously displayed on adjacent to the multimedia file.

The learning interface includes a most searched button that includes at least one of a queries that the user has searched. An input is collected from the user based on at least one of a source. The source is any of a usage pattern, an interaction pattern or an involvement pattern of the user associated with the feature of the product, wherein the source is any of a self-submitted data by the user. The learning interface includes a hub integrator button that provides a description of the product. The description includes of how the product is connected to one or more electronic devices. The a sub set of the multimedia content and the multimedia file are displayed based on a different mode of familiarity of the user associated with the product, and each the mode includes a different set of multimedia files corresponding to the mode of familiarity. A playlist button allows the user to create at least one of a playlist. The playlist includes at least one of a video, a slide show document, a text document, a PDF document, or any of a multimedia content. A bridge button allows the user to create the playlist by bridging at least one of the video, the slide show document, the text document, the PDF document, or any of the multimedia content.

In another aspect, a computer implement method including providing a product specific learning interface that includes integrated multimedia content on product usage and service to a user is provided. The multimedia content demonstrates a feature of a product stored in a database associated with an application server. The method includes processing a first input including a selection of the product from a plurality of products, displaying a product specific learning interface that includes multimedia content specific to the product selected by the input, processing a second input that includes a keyword corresponding to a feature of the product, displaying a sub set of the multimedia content corresponding the keyword and the product, processing a selection of at least one multimedia file from the sub set of the multimedia content, and playing the multimedia file. The multimedia file includes a demonstration of the feature of the selected product. The keyword is filtered only from a set of multimedia content corresponding to selected product.

An audio content associated with the video is simultaneously streamed to the video based on a user language preference. A transcript associated with the video and audio content is simultaneously displayed on adjacent to the multimedia file. The learning interface includes a most searched button that includes one or more queries that the user has searched. A hub integrator button provides a description of the product. The description includes of how the product is connected to one or more electronic devices. A playlist button allows the user to create at least one of a playlist. The playlist may include at least one of a video, a slide show document, a text document, a PDF document, or any of a multimedia content. A bridge button allows the user to create the playlist by bridging one or more of the video, the slide show document, the text document, the PDF document, or any of the multimedia content. The sub set of multimedia content and the multimedia file are displayed based on a different mode of familiarity of the user associated with the product, and each the mode includes a different set of multimedia files corresponding to the mode of familiarity. An input is collected from the user based on at least one of a source. The source is any of a usage pattern, an interaction pattern or an involvement pattern of the user associated with the feature of the product. The source may be any of a self-submitted data by the user.

In yet another aspect, a product specific learning interface system is provided that includes an integrated multimedia content on product usage and service, a database that stores the multimedia content that demonstrates a feature of a product, and a full film module that plays the multimedia content based on a feature of a product selected by a user. The full film module plays a demonstration of a video clip associated with the selected product. The full film module plays the selected feature based on an input associated with the feature of the product. A playlist module that creates at least one playlist based on any of a multimedia content selected by the user. The multimedia content includes any of a video, a slide show document, a text document, a PDF document, or any other multimedia. The full film module includes a control module that controls the speed of the multimedia content when played based on user preference. A language preference module sets a preference for a language selected by the user for the multimedia content associated with the feature of the product. A most searched module displays at least one of a queries that the user has searched frequently.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 8 illustrates a table view of the most searched database of FIG. 2 according to an embodiment herein;

DETAILED DESCRIPTION OF PREFERRED EMBODIMENTS

Figure 1:
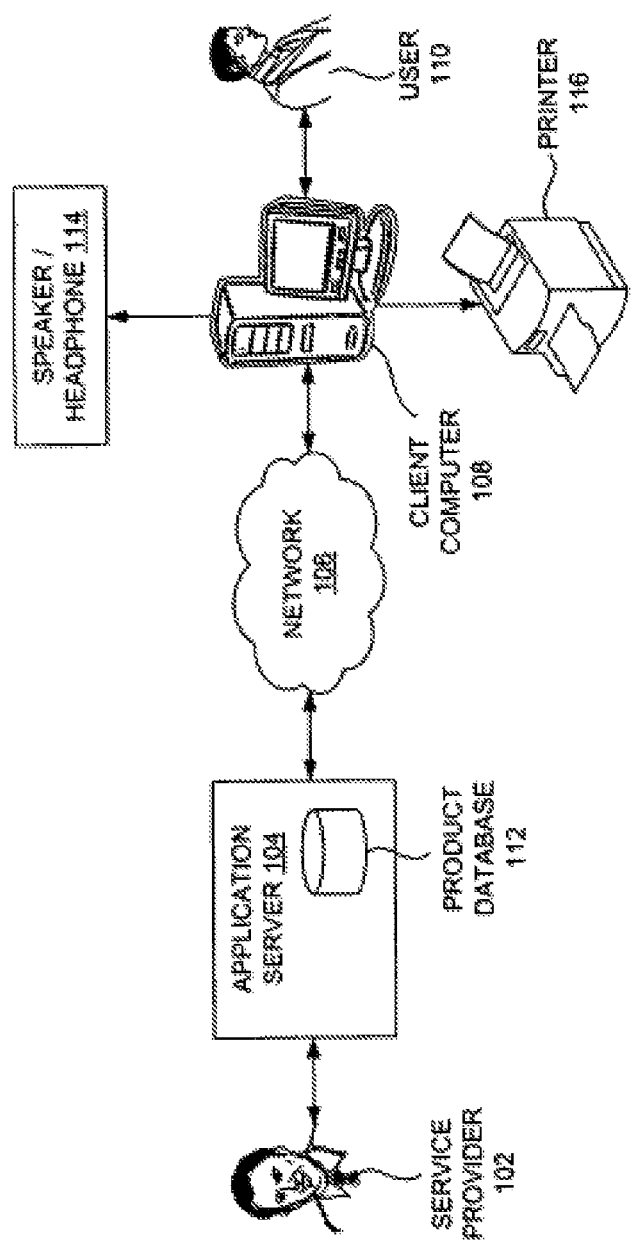
FIG. 1 illustrates a system view of a user communicating with an application server through a network according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve this by facilitating learning interface using multimedia content on product usage and service. Referring now to the drawings; and more particularly to FIGS. 1 through 9, where similar reference characters denote corresponding features consistently throughout the figures, there are shown preferred embodiments.

FIG. 1 illustrates a system view 100 of a user 110 communicating with an application server 104 through a network 106 according to an embodiment herein. The system 100 includes a service provider 102, the application server 104, the network 106, a client computer 108, and the user 110. The application server 104 includes a product database 112. The client computer 108 may include a speaker/headphone 114 and a printer 116.

The application server 104 contains a description manual of products described by the service provider 102 of an electronic document. In one embodiment, the electronic document is a web page. The application server 104 may contain text/transcript of the user manual of the product. In another embodiment, the application server 104 may contain a demo film of the user manual of the product. The product database 112 contains information associated with each of the product. The printer 116 enables the user 110 to print the relevant information from the text/transcript of the user manual.

Figure 2:
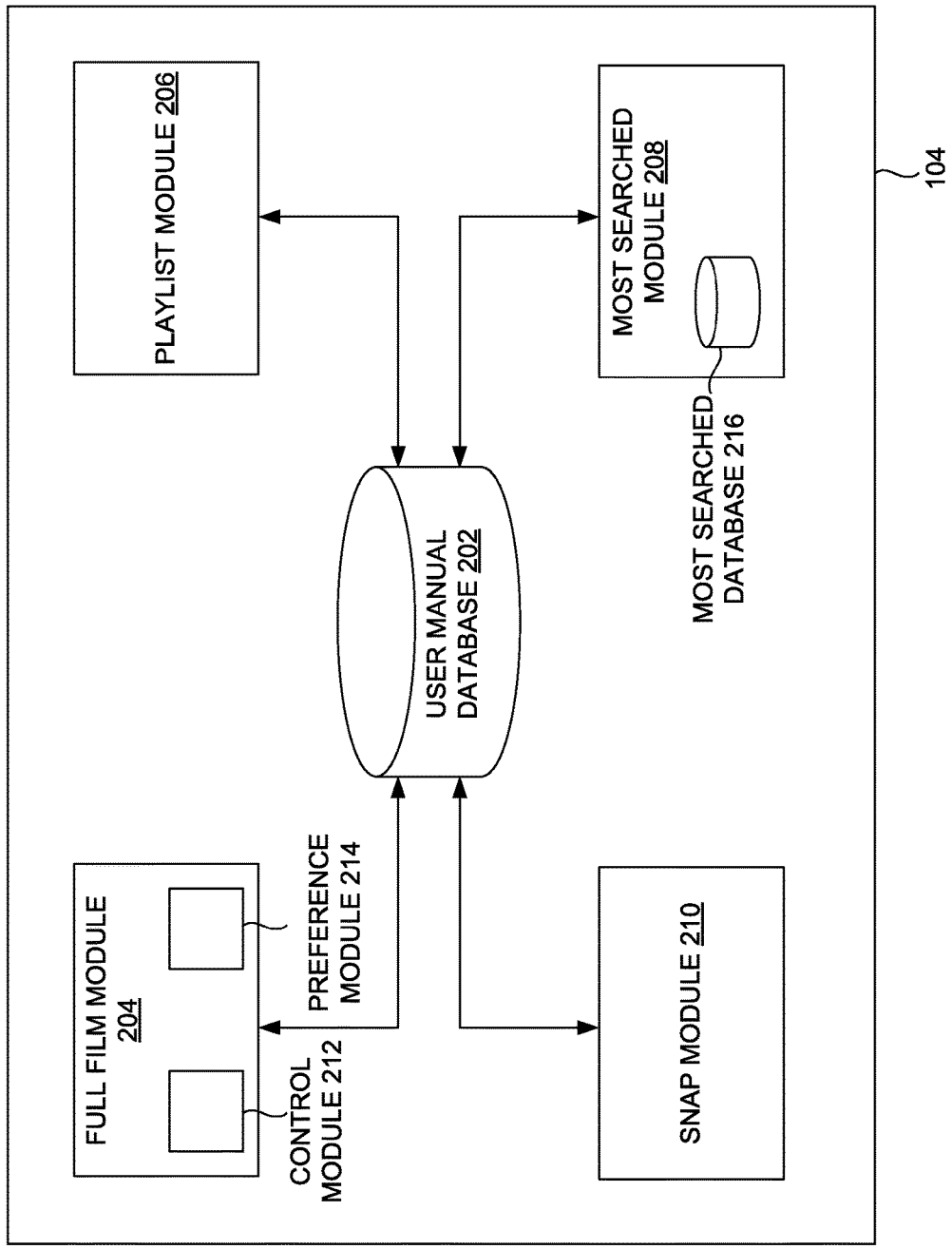
FIG. 2 illustrates an exploded view of the application server of FIG. 1 according an embodiment herein.

FIG. 2 illustrates an exploded view of the application server 104 of FIG. 1 according an embodiment herein. The application server 104 includes a user manual database 202, a full film module 204, a playlist module 206, a most searched module 208, and a snap module 210. The full film module 204 includes a control module 212, and a preference module 214. The most searched module 208 includes a most searched database 216.

The user manual database 202 includes organized information/features associated with the various products. The full film module 204 provides the user 110 an experience of the features associated with the selected product. In one embodiment, the full film module 204 plays a demonstration of a video clip associated with a selected product. In another embodiment, the full film module 204 may provide a related feature associated with the selected product by retrieving the information associated with the selected product from the user manual database 202. In another embodiment, a sub film process built within the playback system prompts users to watch a sub process at an appropriate time within the selected film of a particular feature associated with the product. Once selected (by clicking on the prompt) the user will be taken to a new window and shown the new film while the original film will be paused till the user returns to the window.

The full film module 204 may further provide a demonstration of a video clip indicating an audio and/or a visual to the user 110 to view the selected product. In addition, the full film module 204 offers the user 110 to capture, convert and/or store the audio/visual image of the selected product with a lossless transmission of the signals when requested by the user 110. The application server 104 may further a finder and navigation module (not shown in FIG.) that finds a particular feature of the selected product based on the user's query. In one embodiment, the finder and navigation module may compare the query with the elements in the user manual database 202 and retrieves the relevant information associated with the query of the selected product and provides the user 110 an option to navigate between features of the selected product.

In one embodiment, the Smartstart may provide the features of the product in an advisory format—the best features that a user can use to get value for their investment in the product. The most searched module 208 communicates with the most searched database 216 to retrieve the results of the previous searches. The most searched module 208 provides the user 110 a list of search queries performed by the user 110 as well as other users and associated information of the selected product.

The most searched database 216 contains information associated with the selected products that are searched by the user 110 as well as other users most of the time. The snap module 210 speeds up a search process required by the user 110 based on the level of the user as well as a SmartStart advisory. The playlist module 206 may provide the user with an option to add the videos (or the selected films) associated with a particular feature of the product and allows the user to play the selected film from the playlist. The control module 212 controls the speed of the video clip/film as per the user's requirement. Further, the control module 212 zooms in and zooms out a product shot based on the user's interest. In one embodiment, the speed and the positioned of the video/film is controlled by the control module 212. The preference module 214 sets a preference for a language chosen by the user 110 for a particular video/film associated with the selected product. For an example embodiment, the user may select a film to view the video of the feature of the product and then may select the language of his/her interest.

Figure 3:
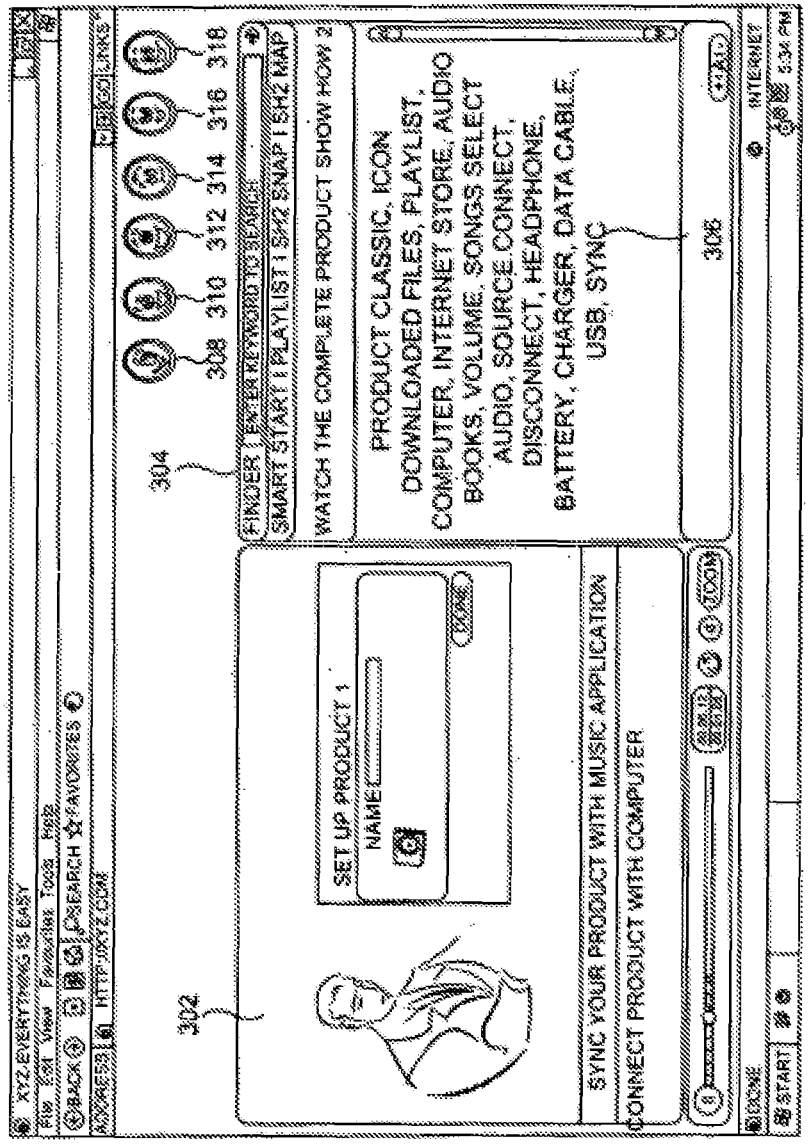
FIG. 3 is a user interface view of the demo film with a tag cloud according to an embodiment herein.
Figure 4A:
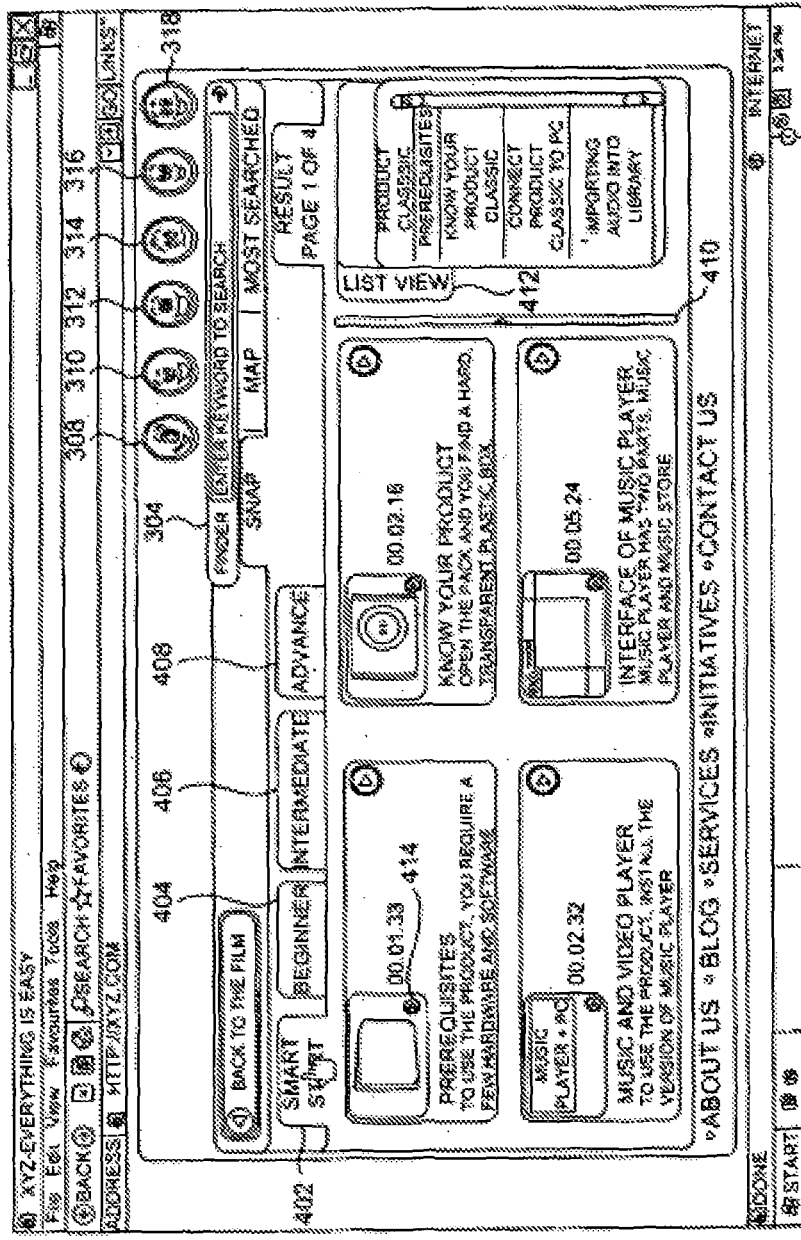
FIG. 4A through 4D illustrates a user interface view having a smart start, a beginner mode, an intermediate mode, and a advance mode according to an embodiment herein.
Figure 4B:
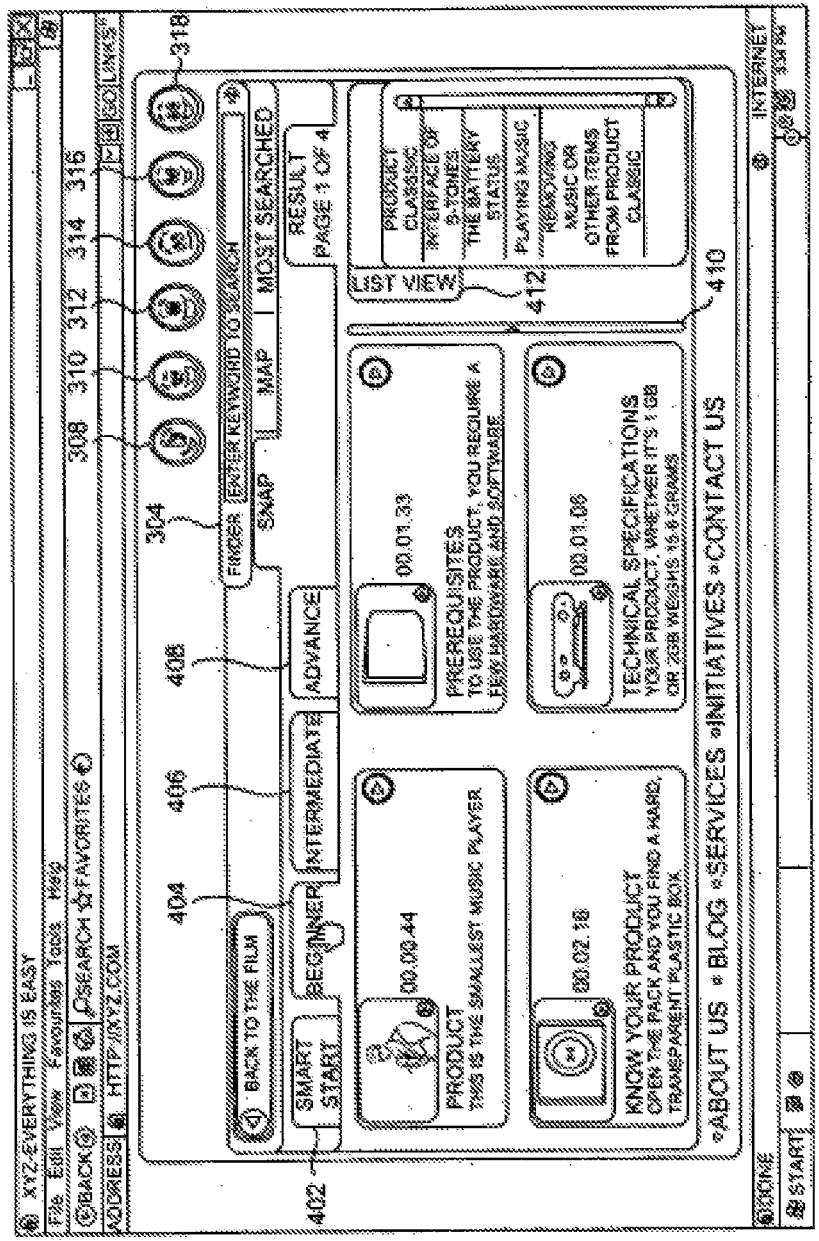
Figure 4C:
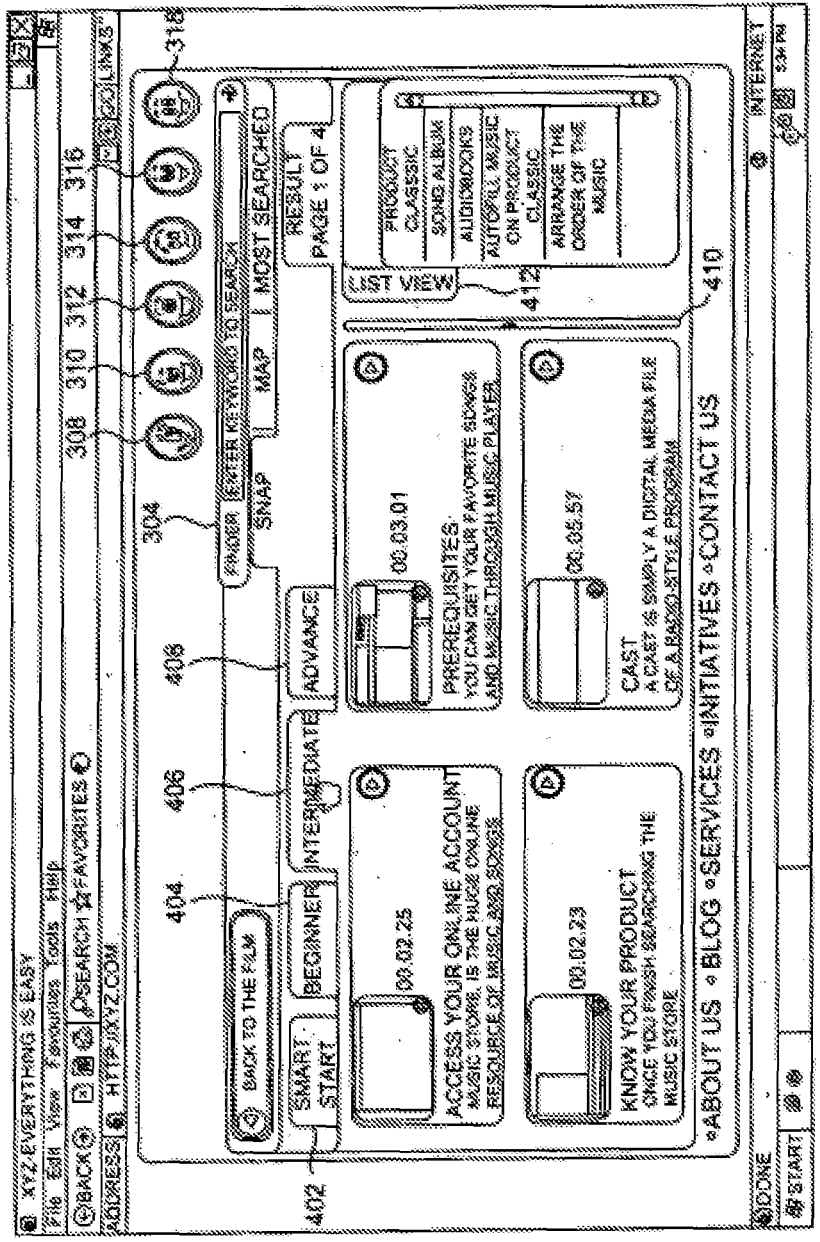
Figure 4D:
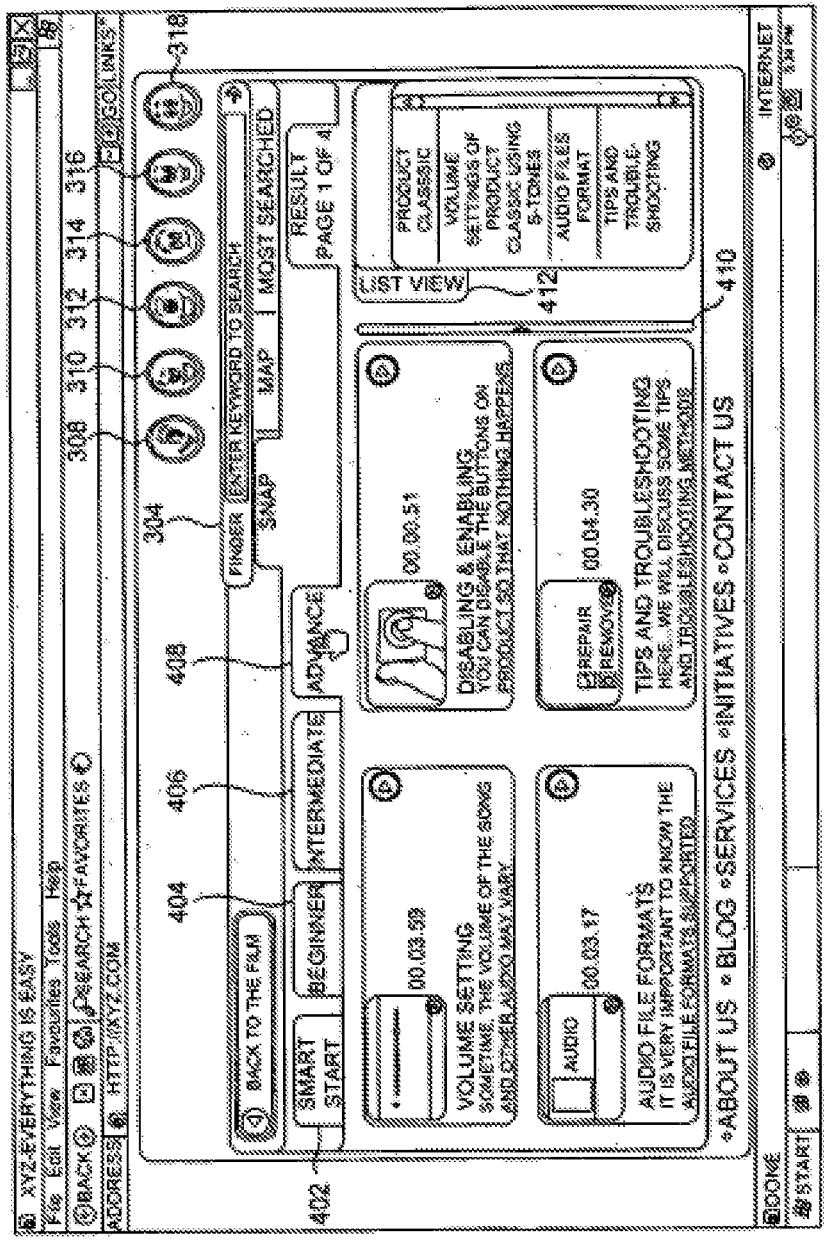

FIG. 3 is a user interface view of the demo film with a tag cloud 306 according to an embodiment herein. The user interface includes a video field 302, a finder navigation bar 304, the tag cloud 306, a guide button 308, my profile button 310, a ispeak button 312, a hub integrator button 314, a community button 316, and a more button 318. The video field 302 displays a demonstration or a demo film of a feature associated with a product. The finder navigation bar 304 allows the user 110 to search for a particular query associated with the selected product. Based on the selection of mode by the user 110, the user 110 may search a query associated with the selected product in the finder navigation bar field 304.

In one embodiment, the finder navigation bar 304 includes a 2 click feature where the user 110 can search what he/she needs in just 2 Clicks. In an example embodiment, click 1 on the product, the user 110 want information about, it will take the user 110 to the product micro portal page and click 2—the user 110 can find answer to the query about that product by the use of the available TAG Cloud (where it lists the most searched links or keywords). The search will display results only for the selected product.

The user 110 can print only these steps which are relevant and interest to user 110 (not shown). In another embodiment, the finder navigation bar 304 may include a most searched button which displays all those queries that other users must have searched already. Further, the relevant sections of the product may be added to user's favorites (not shown). The tag-cloud field 306 displays the most popular keywords that are being used by the users 110. In one embodiment, the keywords are dynamic and only the recent and most popular keywords appear as and when the users perform a keyword search. When a user 110 does a keyword search on a particular product, the search is localized to that particular product only. The user 110 may click on the keyword of his/her interest to retrieve more information associated with the feature of the product.

The guide button 308 allows you to experience the electronic document and its corresponding contents. For example, when a user visits SNAP, the user 110 may then click on the guide button 308. The guide button 308 then displays or takes a tour to how to use the SNAP feature. The My profile button 310 allows the user 110 to navigate to his/her profile and update the desired profile information. The ispeak button 312 is a combination of a happy and a lost feedback. The ispeak button 312 allows the user 110 to write comments on the features and/or the products that the user 110 has experienced. The hub integrator button 314 provides a description of products on how the products can be connected to other devices. For example, how to connect your products with other electronic appliances or products such as TV, music system and/or DVD player.

The community button 316 allows the user 110 to share their suggestions, opinions, and other related information associated with the features of the products with a group of other users having a common interest. The community button 316 allows the user 110 to join and unjoin a particular community of his/her own interest. The more button 318 is a edited link system related to each product and available from the product home page in the interface. The list is segregated and searchable (and enriched by crowd sourcing—i.e. participation of the users and the users 110 can submit links appropriately tagged and with description of what that link is useful for and why it is being recommended).

FIG. 4A through 4D illustrates a user interface view having a smart start 402, a beginner mode 404, an intermediate mode 406, and a advance mode 408 according to an embodiment herein. The modes 402-408 display a thumbnail preview of the demo films. The modes 402-408 allow the user 110 to experience different level of skills and features of the selected product (e.g., how to use the product, know your product, interface with the product, hardware and software details of the product, technical specifications, how to search in a music store, tips and troubleshooting techniques, enabling and disabling of features associated with selected product, volume settings, etc.).

The user interface view of FIG. 4A through 4D further includes a scroll option 410, a list view. 412, a thumbnail playback option 414, and a finder navigation bar 304. The scroll option 410 allows the user 110 to scroll up or down for various skills and features of the selected product. A different view is provided as a List View 412 which allows faster navigation between results. The thumbnail playback option 414 allows the user 110 to playback within the thumbnail for previews. The thumbnail playback option 414 enables the user 110 to check whether the user 110 is viewing the right demo film. The finder navigation bar 304 allows the user 110 to search for a particular query associated with the selected product. Based on the selection of mode by the user 110, the user 110 may search a query associated with the selected product in the finder navigation bar field 304.

Figure 5:
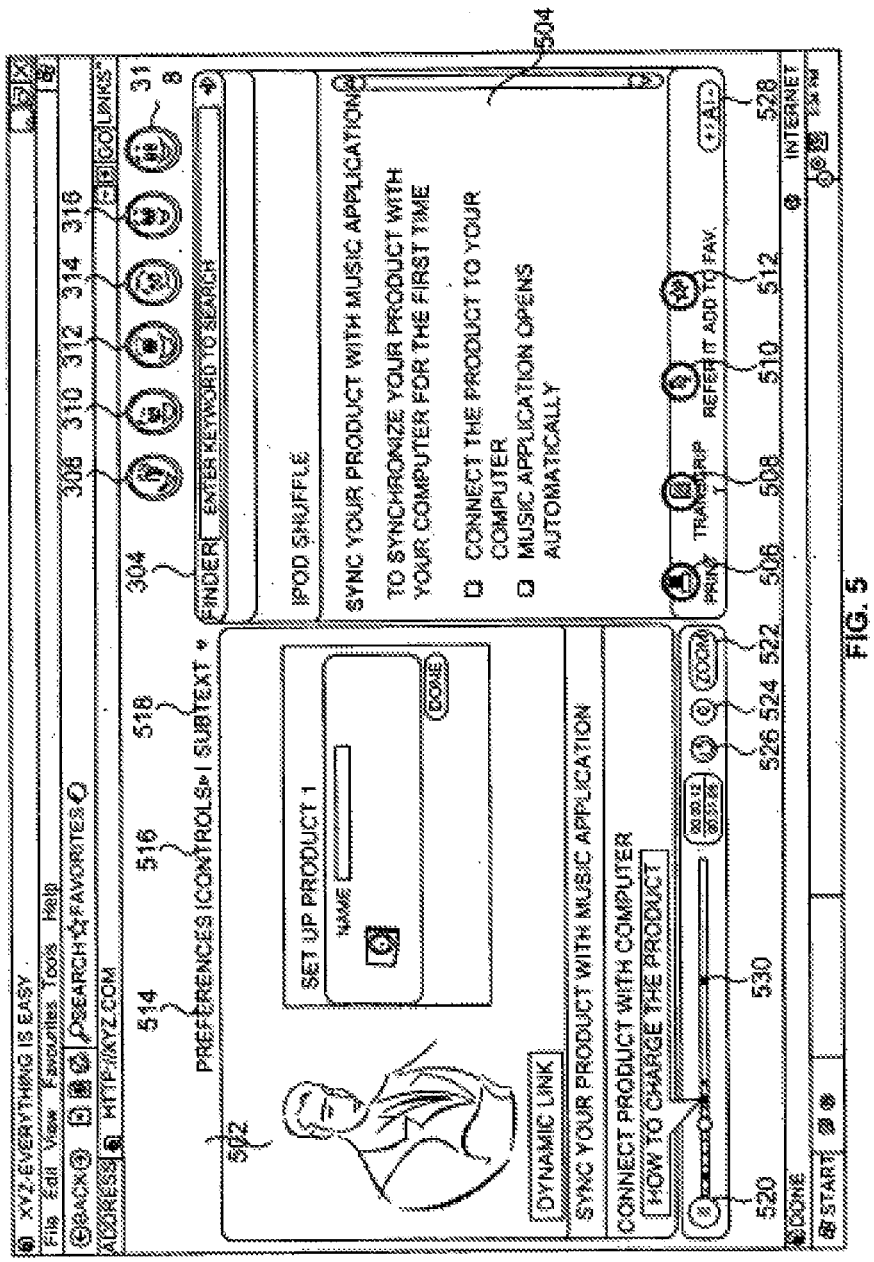
FIG. 5 illustrates a user interface view of the demo film with a text according to an embodiment herein.

FIG. 5 illustrates a user interface view of the demo film with a text according to an embodiment herein. The user interface view includes a video player field 502, a text field 504, a print field 506, a transcript field 508, a refer it field 510, and an add to favorites field 512. The video player field 502 further includes a preference field 514, a control field 516, a subtext field 518, a play button 520, a zoom button 522, a volume button 524, and a replay field 526. The user interface view further includes a font field 528, a finder navigation bar 304, and a time stamps field 530.

The text field 504 describes the product chapter wise and is directly linked to the feature being demoed in the film. The user 110 may skip from one chapter to another and the text of the corresponding chapter is displayed. In one embodiment, when the user 110 skips a video portion of a product and navigates to another portion of the video film of the product, the corresponding text tied to the video film may be displayed in the text field 504. The print button 506 provides the user 110 an option to print only the relevant information associated with the selected product and the selected feature.

The transcript field 508 allows the user to stop the film and to make the transcript covering the whole screen on a personal computer (or a laptop). The transcript field 508 enables the user 110 to perform a key word search and takes the user 110 to the relevant page available based on the query. The refer it field 510 provides the user 110 to write notes, comments or resource link. The notes, comments or the resource link may be saved for personal viewing. The comments may be submitted to be viewed by the other users. The resource link may be a useful links of the product posted with relevant URL so that the other users may benefit from one's knowledge. The resource link may be provided in the deep link system of the electronic document.

The add to favorites field 512 enables the user to add the interesting portion into his/her favorites so that it may be retrieved easily later. The preference field 514 enables the user 110 to select a preferred language, an accent, a presenter and/or a subtitle. In one embodiment, the preferred languages may be at least one of the English, French and/or Spanish, etc. The control field 516 enables the user to control a brightness of a video, a video speed and a zooming of motion of video within the video player field 502. The subtitle field 518 is provided to select the language of the subtitles displayed below the video player 502 within the screen of the video.

The play button 520 enables the user 110 to play and pause the product information film. In one embodiment, a dynamic film link is embedded to the demo film segment. In another embodiment, it is a text/web link. In yet another embodiment, the link may be an external web site link. When a user 110 is watching a demo film, the user 110 can click on that dynamic link and this navigates the user 110 to another window with a demo film that may be useful to the user 110. The user 110 can then come back to the original demo film and watch after closing the dynamic link.

The zoom button 522 enables the user 110 to view the focused area of the film (e.g., a product shot) by zooming in and zooming out the video film. The volume button 524 enables the user to adjust the volume of the video film. The replay field 526 enables the user 110 to replay the full film or rewind the film by dragging (e.g., and/or navigating) the play bar in required direction or steps/specific points. The font field 528 allows the user 110 to increase and/or decrease the font size in the text field 504.

The finder navigation bar 304 may include a snap feature, a map feature, a most searched feature. The snap feature may be divided into modes (e.g., SmartStart, beginner, intermediate and/or advanced) based on the user experience with the selected product. The most searched feature contains all those queries that other users may have searched already. In addition, the finder navigation bar 304 provides a 2 click feature where the user 110 at one click can find the product and at a second click can know related information associated with the selected product by the use of the Tag cloud.

In one embodiment, the finder navigation bar 304 allows the user 110 to perform a keyword search on a transcript for a particular feature of the selected product. The user 110 may then click on the keyword in the transcript which will navigate to a demo film of the feature. In other words, the user 110 may click on the keyword (e.g., a feature of the product) in the transcript and may view a demo of the feature associated with the selected product. The finder navigation bar 304 allows the user 110 to perform a keyword search (e.g., a feature of the selected product) and corresponding transcript will be display associated with the keyword. The user 110 may click on the keyword in the transcript and can navigate to the demo of that selected feature associated with the product.

The time stamps field 530 includes different time points for a selected film by the user. The time stamps indicate a number of steps in the particular film of the selection feature of the product. These time stamps allow the user to choose the film part (or step) of the selected feature associated with the product which is of interest to him/her. For an example, if the user selects a particular demo film (e.g., on how to connect your product to your personal computer) and the demo film includes 3 time stamps with the film segment. Each of the time stamps provides a video demonstration of each of the step of that particular feature of the product. In another example, the 3 time points may include put your product on the dock by inserting the jack in the input-output port, plug in the dock USB connector to the USB port of your personal computer; and the application program opens automatically.

The user may experience a mouse hover on the time points and the step or process text of that particular film will be displayed to the user. The user may then select the desired time point and click the time point to play that particular feature within the film segment. In other words, the user may select the first time point or the second time point or the third time point. Based on the selection performed by the user, the particular step or process associated with the feature of the product at that time stamp will be played.

Figure 6:
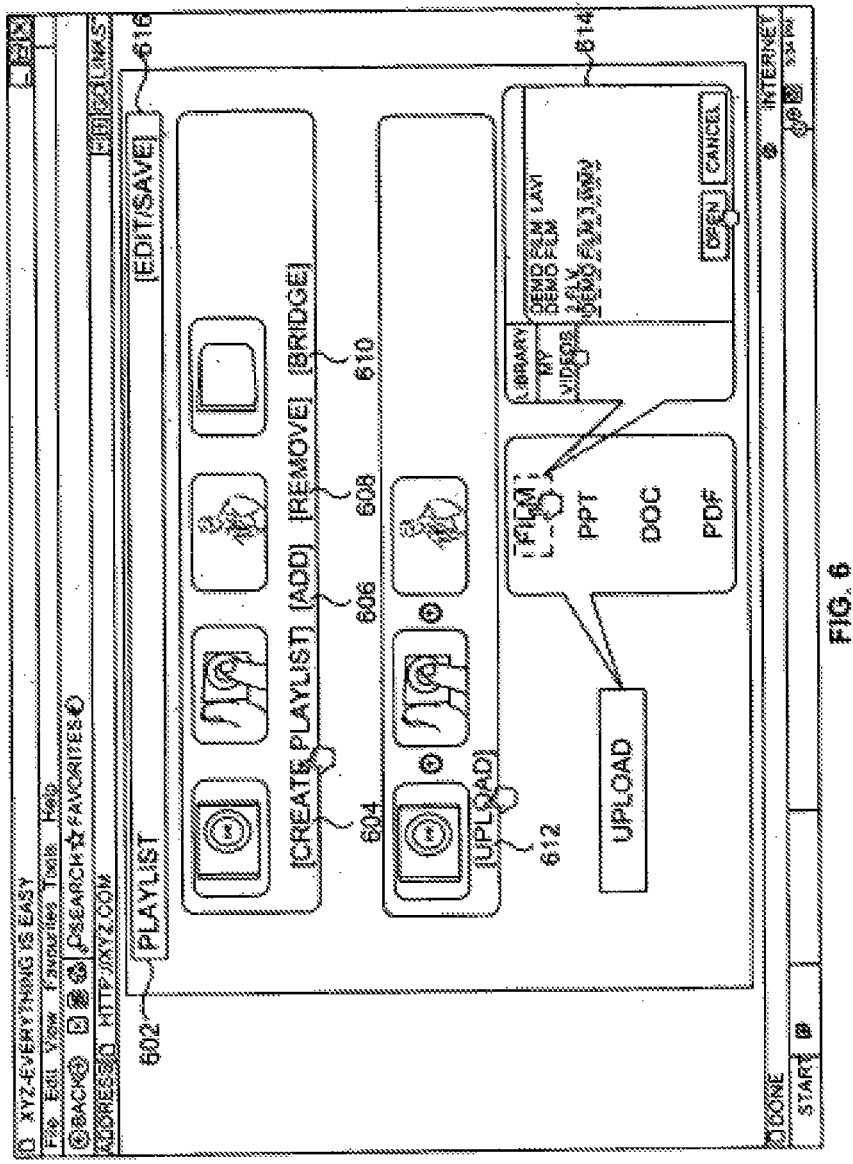
FIG. 6 is a user interface view of a playlist of demo films illustrating a creation of playlist by the user according to an embodiment herein.

FIG. 6 is a user interface view of a playlist of demo films 602 illustrating a creation of playlist by the user 110 according to an embodiment herein. The playlist of demo films field 602 includes a create playlist option 604, a add option 606, a remove option 608, a bridge option 610, an upload option 612, and browse option 614, and an edit/save option 616. The create playlist option 604 allows the user 110 to create a playlist of his/her own interest. The user 110 can add and remove the demo films to the new playlist or the existing playlist using the add option 606, and the remove option 608.

The bridge option 610 allows the user 110 to bridge the demo films added by him/her so as to continuously play the added demo films. The upload option 612 allows the user 110 to upload the demo films to the playlist. In one embodiment, the user 110 may also upload a slide show document, a text document, and/or a PDF document by browsing the content using the browse option 614. The edit/save option 616 allows the user 110 to edit the existing playlist or the new playlist and save the playlist.

For an example, as shown in FIG. 6, the user 110 uploads the demo films by browsing the videos (e.g., my videos). The user 110 can select the videos/demo films (e.g., demo film 1.avi, demo film 1.flv, and demo film 1.wmv) and click on open to add the demo films to the playlist. The user 110 then clicks to the upload option 612 to upload the demo films to the playlist. In an example embodiment, users will be given an interface to drag and drop various demo films to combine their individual actions to perform a completely different end objective. Users will be able to also add their personal bridges using video, audio, still pictures/slideshow presentations, photos, text or any other type of media. Users can then share them on the site or other social networking sites. In another example embodiment, the electronic document may also include the pre-existing generic playlists which cannot be edited by the users 110.

Figure 7:
FIG. 7 illustrates a table view of the user manual database of FIG. 2 according to an embodiment herein.

FIG. 7 illustrates a table view of the user manual database 202 of FIG. 2 according to an embodiment herein. The user manual database 202 includes a product field 702, a feature field 704, a transcript field 706, a video link field 708, an audio link field 710, and a timestamp field 712. The product field 702 includes products (e.g., product 1 and/or product 2, etc.). In one embodiment, the product 1 and the product 2 may be a portable music player. The feature field 704 includes features of each product (e.g., feature 1A, feature 1B and feature 1C of product 1 and feature 2A and feature 2B of product 2). In one embodiment, the feature may be a charge the product, connect the product to a personal computer, an interaction with a music application on the personal computer, tips and troubleshooting techniques, and/or know the product.

The transcript field 706 includes the transcripts (e.g., or a text) corresponding to the features of the product. In one embodiment, transcript 1 may be the description of feature 1A associated with product 1, transcript 2 may be the description of feature 1B associated with the product 1, and transcript 3 may be the description of feature 1C associated with product 1. In another embodiment, the transcript 4 may be the description of feature 2A associated with product 2, and the transcript 2 may be the description of feature 2B associated with the product 2.

The video link field 708 includes corresponding demo films links (e.g., a URL of videos 1-5) of each feature of the product (e.g., product 1 and product 2). In one embodiment, the video 1 may be the demo film of feature 1A, the video 2 may be the demo film of feature 1B, the video 3 may be the demo film of feature 1C, the video 4 may be the demo film of feature 2A and video 5 may be the demo film of feature 2B. For an example embodiment, the video links associated with the feature of the products are streamed to the video player when the user 102 clicks on any of the feature to view the demo of the product. In one embodiment, video links are streamed by the video provider module 306 of FIG. 3.

The audio link field 710 includes the audio links (e.g., a URL of the videos 1-5 associated with the feature of the product). The audio links associated with the feature of the products are streamed to the video player linking the audio to the particular feature of the product when the user 110 clicks on any of the feature to view the demo of the product.

In one embodiment, the audio links are streamed. The user 110 may choose any language for an audio to be played associated with the selected feature of the product.

The timestamp field 712 includes a time duration of the demo film (e.g., or video file) and an audio file associated with the feature of the product. For an example embodiment, the timestamp for the feature 1A, 1B and 1C of product 1 are 180 seconds, 245 seconds and 300 seconds. Similarly, the timestamp for the feature 2A and 2B of product 2 are 125 seconds and 200 seconds. Further pointers within the time stamps will provide the provision of jumping to specific points or steps associated with the video for Feature 1A with 180 seconds which allow user to watch/replay specific portions of the film within the 180 seconds.

FIG. 8 illustrates a table view of the most searched database 216 of FIG. 2 according to an embodiment herein. The most searched database 216 includes a product field 802, a user search field 804, a feature field 806 and a number of hits field 808. The product field 802 may include product information associated with the selected product. In one embodiment, the product may be a portable music player. The user search field 804 includes a query constructed by the user 110. In one embodiment, the query constructed may be query1, query2, and/or query3, etc. In one embodiment, the queries may include display settings, equalizer control, etc. The feature field 904 includes the features resulting from the query constructed in the user search field 902 (e.g., feature 1A results from query1, feature 1C results from query 2 and so on). The number of hits field 806 includes the number of results resulting from the query. In one embodiment, the number of hits may be 5 for query1, 8 for query 2, 6 for query 3 and 8 for query 4. The most searched database 212 may be used to retrieve the most searched information and may be used to gain information from one's knowledge.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections).

In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor. The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 9:
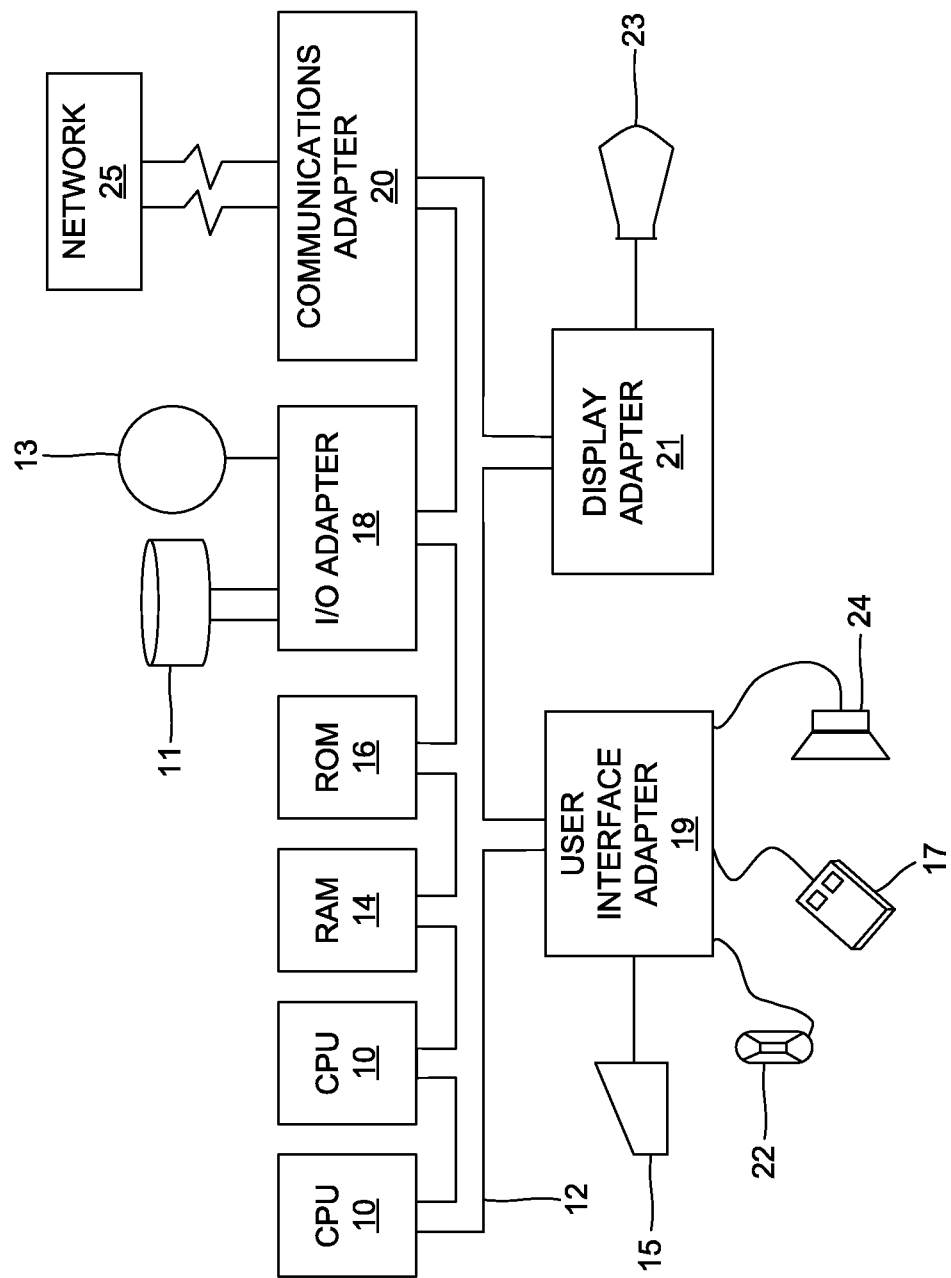
FIG. 9 illustrates a schematic diagram of a computer architecture used in accordance with the embodiment herein.

A representative hardware environment for practicing the embodiments herein is depicted in FIG. 9. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 10:
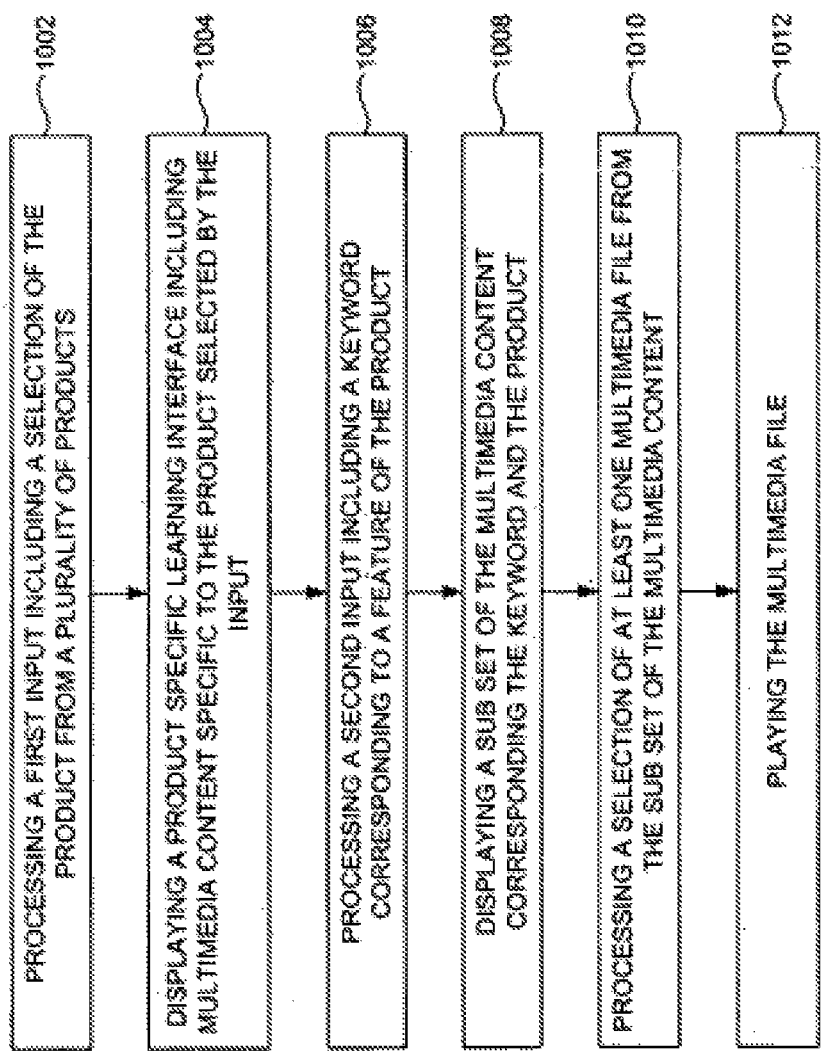
FIG. 10 is a flow diagram illustrating a method that includes providing a product specific learning interface comprising integrated multimedia content on product usage and service to a user according to an embodiment herein.

FIG. 10 is a flow diagram illustrating a method that includes providing a product specific learning interface comprising integrated multimedia content on product usage and service to a user according to an embodiment herein. The multimedia content demonstrates a feature of a product stored in the database 112 associated with the application server 104. In step 1002, a first input that includes a selection of the product from a plurality of products is processed. In step 1004, a product specific learning interface that includes the multimedia content specific to the product selected by the first input is displayed. In step 1006, a second input that includes a keyword corresponding to a feature of the product is processed. In step 1008, a sub set of the multimedia content corresponding the keyword and the product is displayed.

The keyword is filtered only from a set of multimedia content corresponding to selected product. In step 1010, a selection of at least one multimedia file from the sub set of the multimedia content is processed. In step 1012, the multimedia file is played. The multimedia file includes a demonstration of the feature of the selected product. An audio content associated with the video is simultaneously streamed to the video based on a user language preference. A transcript associated with the video and audio content is simultaneously displayed on adjacent to the multimedia file.

The learning interface includes a most searched button that includes at least one of a queries that the user has searched. An input is collected from the user 110 based on at least one of a source. The source is any of a usage pattern, an interaction pattern or an involvement pattern of the user associated with the feature of the product. The source is any of a self-submitted data by the user. The learning interface may include a hub integrator button that provides a description of the product. The description includes of how the product is connected to one or more electronic devices. The sub set of the multimedia content and the multimedia file are displayed based on a different mode of familiarity of the user associated with the product, and each the mode includes a different set of multimedia files corresponding to the mode of familiarity.

A playlist button allows the user 110 to create one or more playlists that may include one or more of a video, a slide show document, a text document, a PDF document, or any of a multimedia content. The learning interface further includes a bridge button that allows the user 110 to create the playlist by bridging one or more of the video, the slide show document, the text document, the PDF document, or any of the multimedia content.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for retrieving a video associated with a feature of a product from an application server comprising a processor and a memory that stores a user manual database, said method comprising:
   receiving, by said processor, a first input comprising a selection of said product from a plurality of products, wherein said user manual database comprises (i) videos that demonstrate a plurality of features of said plurality of products, and (ii) features associated with said videos, wherein each of said videos of said user manual database is pre-linked to (i) at least one feature of a product, and (ii) a transcript that corresponds to an audio of each of said videos;
   retrieving, from said user manual database in said memory, videos specific to said product based on said selection for display as a product specific learning interface;
   receiving a second input comprising a keyword corresponding to said feature of said product;
   comparing said keyword with (i) a list of features and (ii) transcripts that correspond to audios of said videos which are specific to said product;
   displaying a video from said videos which are specific to said product, wherein a feature associated with said video matches with said keyword, and a transcript that corresponds to an audio of said video also matches with said keyword; and
   playing said video, wherein said audio associated with said video is simultaneously streamed to said video based on a user language preference, wherein said transcript associated with said audio and said video is simultaneously displayed adjacent to said video, wherein said video, said audio and said transcript demonstrate how to use said feature of said product to said user.

2. The method of claim 1, wherein said sub set of said videos and said video are displayed based on a different mode of familiarity of said user associated with said product, wherein said different mode of familiarity comprises a beginner mode and an advance mode, and each said mode comprises a different set of videos corresponding to said mode of familiarity.

3. The method of claim 1, wherein said learning interface comprises a playlist button that allows said user to create at least one of playlist, wherein said playlist comprises at least one of a video, a slide show document, a text document, and a PDF document.

4. The method of claim 3, wherein said learning interface further comprises a bridge button that allows said user to create said playlist by bridging at least one of said video, said slide show document, said text document, and said PDF document.

5. The method of claim 1, further comprising:
   processing an input comprising a keyword to search on said transcript for a particular feature of said selected product; and
   processing a selection of said keyword in said transcript that facilitates navigating to a demo film of said feature.

6. The method of claim 1, wherein said sub set of videos are filtered from said videos based on a comparison of said keyword with transcripts associated with said videos specific to said product.

7. The method of claim 1, wherein said sub set of videos are filtered from said videos based on a comparison of said keyword with a plurality of tags associated with said videos specific to said product.

8. A method for retrieving a video associated with a feature of a product from an application server comprising a processor and a memory that stores a user manual database, said method comprising:
   receiving, by said processor, a first input comprising a selection of said product from a plurality of products, wherein said user manual database comprises (i) videos that demonstrate a plurality of features of said plurality of products, and (ii) features associated with said videos, wherein each of said videos of said user manual database is pre-linked to (i) at least one feature of a product, and (ii) a transcript that corresponds to an audio of each of said videos;
   retrieving, from said user manual database in said memory, videos specific to said product selected by said first input for display as a product specific learning interface;
   receiving a second input comprising a keyword corresponding to said feature of said product;
   comparing said keyword with (i) a list of features and (ii) transcripts that correspond to audios of said videos which are specific to said product;
   displaying a video from said videos which are specific to said product, wherein a feature associated with said video matches with said keyword, and a transcript that corresponds to an audio of said video also matches with said keyword; and
   playing said video.

9. The method of claim 8, wherein said transcript associated with said audio and said video is simultaneously displayed adjacent to said video, wherein said video, said audio and said transcript demonstrate how to use said feature of said product to said user.

10. The method of claim 8, wherein said learning interface comprises further comprises a playlist button that allows said user to create at least one of a playlist, wherein said playlist comprises at least two of a video, a slide show document, a text document, and a PDF document.

11. The method of claim 10, wherein said learning interface further comprises a bridge button that allows said user to create said playlist by bridging at least one of said video, said slide show document, said text document, and said PDF document.

12. The method of claim 8, wherein said sub set of videos and said video are displayed based on a different mode of familiarity of said user associated with said product, wherein said different mode of familiarity comprises a beginner mode and an advance mode, and each said mode comprises a different set of videos corresponding to said mode of familiarity.

13. The method of claim 8, further comprising:
   processing an input comprising a keyword to search on said transcript for a particular feature of said selected product; and
   processing a selection of said keyword in said transcript that facilitates navigating to a demo film of said feature.

14. The method of claim 8, wherein said sub set of videos are filtered from said videos based on a comparison of said keyword with transcripts associated with said videos specific to said product.

15. The method of claim 8, wherein said sub set of videos are filtered from said videos based on a comparison of said keyword with a plurality of tags associated with said videos specific to said product.

16. A product specific learning interface system for retrieving a video associated with a feature of a product from an application server comprising a processor and a memory that stores a user manual database, said system comprising:
- a first interface, by said processor, that receives a first input comprising a selection of said product from a plurality of products, wherein said user manual database comprises (i) videos that demonstrate a plurality of features of said plurality of products, and (ii) features associated with said videos, wherein each of said videos of said user manual database is pre-linked to (i) at least one feature of a product, and (ii) a transcript that corresponds to an audio of each of said videos;
- a second interface that retrieves videos, from said user manual database in said memory, that are specific to said product selected based on said first input for display as a product specific learning interface; and
- a keyword interface that
  - receives a second input comprising a keyword corresponding to said feature of said product;
  - compares said keyword with (i) a list of features and (ii) transcripts that correspond to audios of said videos which are specific to said product;
  - displays a video from said videos which are specific to said product, wherein a feature associated with said video matches with said keyword, and a transcript that corresponds to an audio of said video also matches with said keyword; and
- a full film module that plays said video, wherein said audio associated with said video is simultaneously streamed to said video based on a user language preference, wherein said transcript associated with said audio and said video is simultaneously displayed adjacent to said video, wherein said video, said audio and said transcript demonstrate how to use said feature of said product to said user.

17. The system of claim 16, further comprising a playlist module that creates at least one playlist based on any of a multimedia content selected by said user, wherein said playlist comprises at least one of a video, a slide show document, a text document, and a PDF document.

18. The system of claim 16, further comprising a finder navigation bar that:
- processes an input comprising a keyword to search on said transcript for a particular feature of said selected product; and
- processes a selection of said keyword in said transcript that facilitates navigating to a demo film of said feature.

19. The system of claim 16, wherein said sub set of videos are filtered from said videos based on a comparison of said keyword with transcripts associated with said videos specific to said product.

20. The system of claim 16, wherein said sub set of videos are filtered from said videos based on a comparison of said keyword with a plurality of tags associated with said videos specific to said product.

* * * * *